March 26, 1929.  J. T. DILLON  1,707,053
MOTION REVERSING MECHANISM
Filed July 9, 1927   2 Sheets-Sheet 1
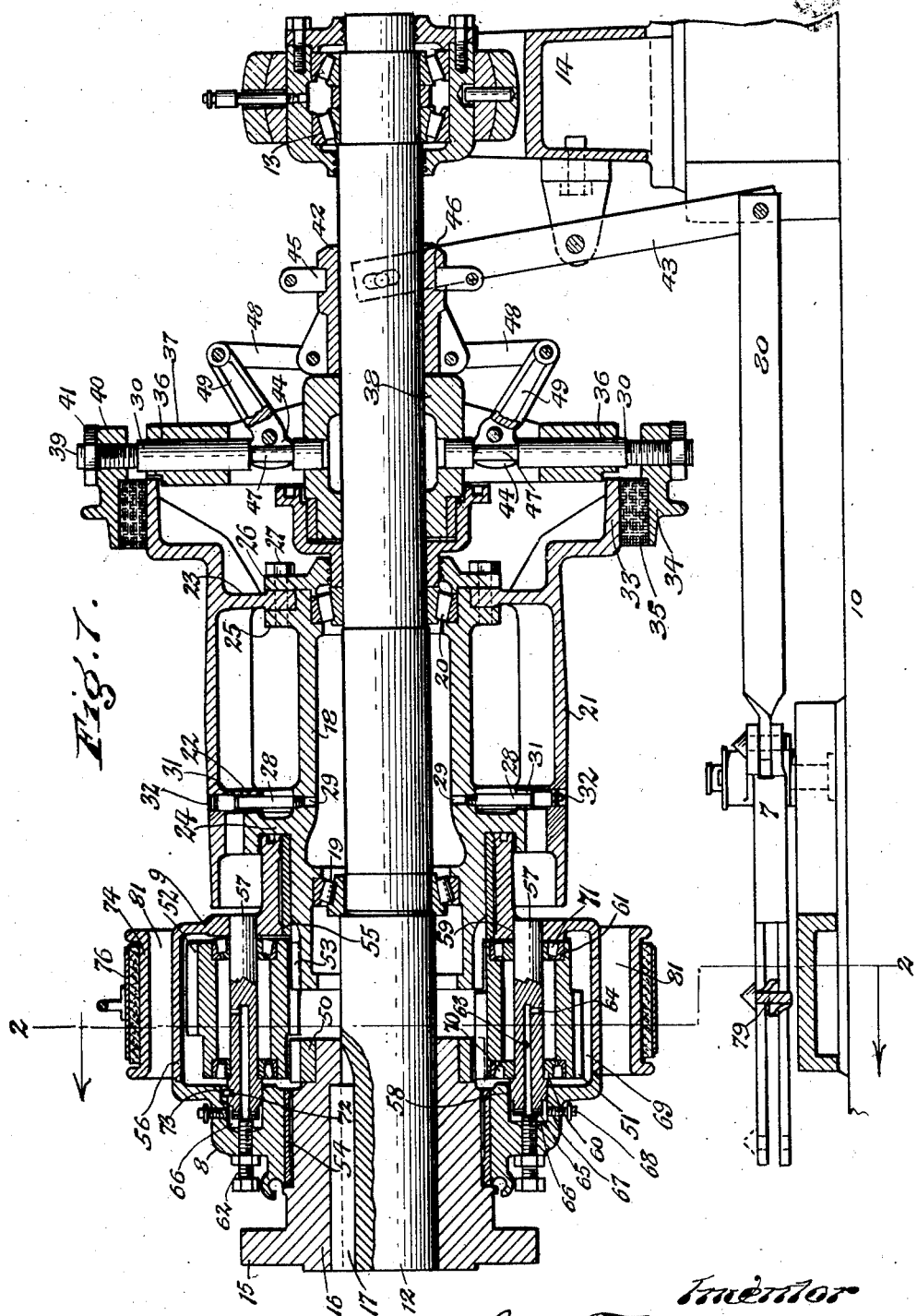

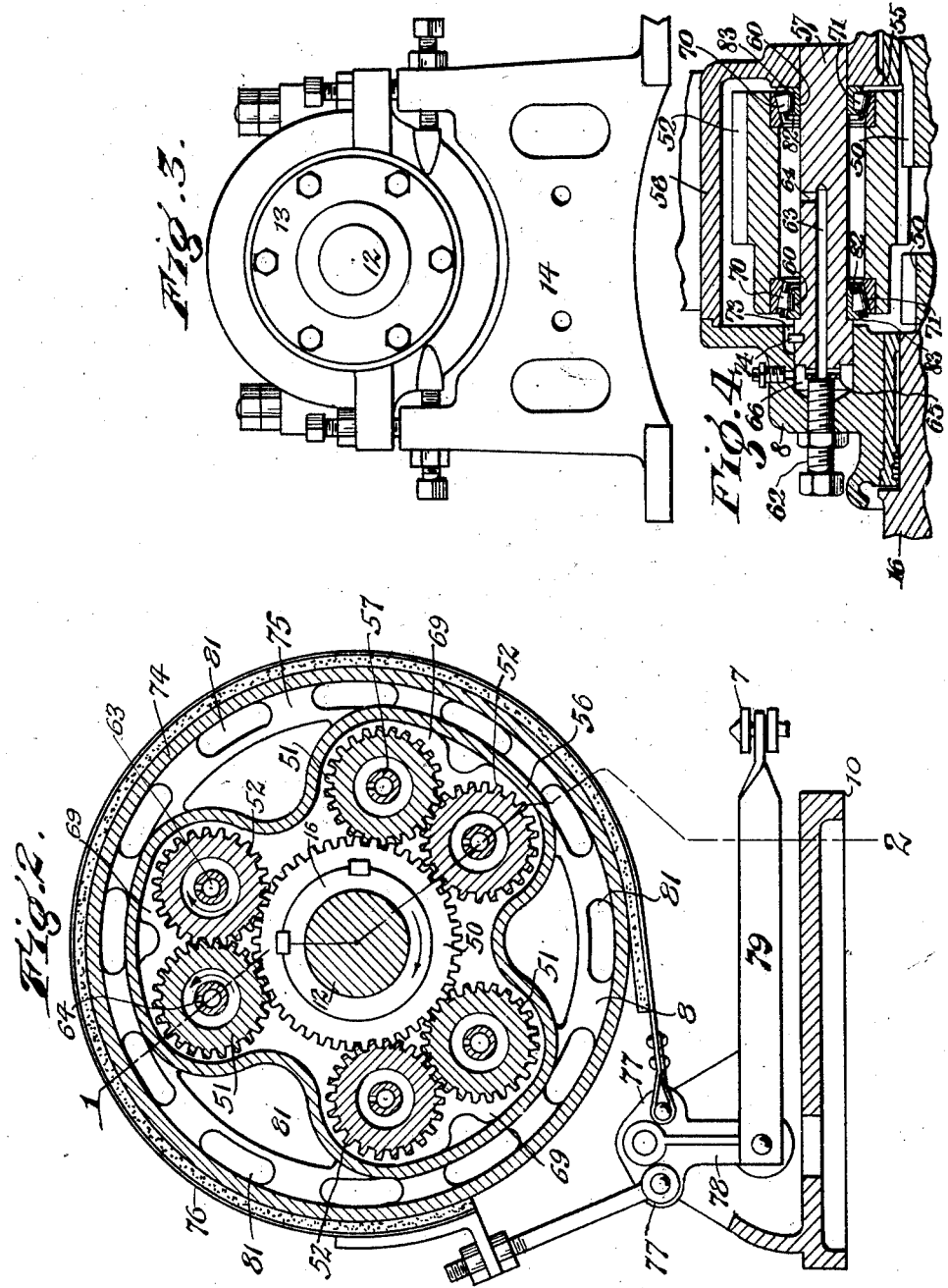

Patented Mar. 26, 1929.

1,707,053

UNITED STATES PATENT OFFICE.

JOHN T. DILLON, OF BUFFALO, NEW YORK, ASSIGNOR, BY MESNE ASSIGNMENTS, TO STRUTHERS-WELLS-TITUSVILLE CORPORATION, OF WARREN, PENNSYLVANIA, A CORPORATION OF MARYLAND.

MOTION-REVERSING MECHANISM.

Application filed July 9, 1927. Serial No. 204,459.

This invention relates to a heavy duty motion reversing mechanism which is more particularly designed for use in oil well machinery whereby various tools and apparatus are raised and lowered during the operations of drilling, completing and pumping an oil well by a prime mover, such as a gas engine, which runs without reversing its motion.

It is the purpose of this invention to provide an improved reversing gearing of this character which is simple, durable and compact in construction and operation, which has its brake mechanism so designed that the same is prevented from becoming unduly hot, and is provided with means for efficiently lubricating the pinions of the reversing gearing.

In the accompanying drawings:

Figure 1, is a vertical longitudinal section of the reversing gearing embodying my improvements, the section being taken on line 1—1, Fig. 2.

Figure 2 is a cross section taken on line 2—2 Fig. 1.

Figure 3 is an end view of the outboard bearing of the driven shaft.

Fig. 4 is a longitudinal section of one of the intermediate planetary gear pinions and the adjacent part of the housing carrier, the spindle for pivotally mounting the pinion on the carrier and the means for adjusting the bearing between the spindle and the pinion.

Similar characters of reference indicate like parts in the several views of the drawings:—

The reference numeral 10 represents the base of the motion reversing mechanism, 12 the driving shaft, and 13 the outboard bearing whereby the outer end of the shaft is journaled on the pedestal 14 rising from the base.

The driving shaft is rotated in the same direction by a motor of any suitable character, such for example as a non-reversing gas engine, the power shaft of which is provided with a suitable flange for connection with a coupling flange 15 carried by a driving sleeve 16, which is secured by a key 17, or other suitable means to the outer end of the driving shaft.

Surrounding the opposing inner ends of the central part of the driving shaft is a driven sleeve 18 which is journaled on the inner part of the shaft by means of roller bearings 19, 20, and is adapted to either turn around said shaft or to turn with the same. On this driven sleeve is mounted a pulley 21 from which power is taken off by means of a hoisting rope, cable or the like for raising and lowering any tools or equipment used in the operation of drilling a well and getting the same ready for use. This pulley is preferably mounted on the driven sleeve so as to turn therewith by engaging the radial sides of internal flanges 22, 23 on the pulley with the corresponding sides of the external flanges 24, 25 on the driven sleeve, a clamping ring 26 engaging the opposite radial side of one of the pulley flanges, and fastening screws 27, connecting said clamping ring and the respective internal and external flanges.

Lubrication of the bearings of the driven sleeve which supports the pulley is preferably effected by a plurality of supply ducts 28 each having its inner end secured in an opening 29 which communicates with the bore of the driven sleeve between its bearings while its outer end is arranged in a radial passage 31 in the inner flange 22 of the pulley and provided with a screw plug 32. Upon removing the plug 32 a lubricant, either in the form of oil or grease may be introduced into the driven sleeve from which it flows to the bearings 19, 20, so as to insure easy running and reduced wear.

A clutch is provided for coupling the pulley and shaft so as to compel the same to turn together by a direct drive in a forward direction and uncoupling the same so as to permit of driving the pulley indirectly from the driving shaft in a reverse direction. This clutch in the preferred form shown in the drawings, is constructed as follows:

The numeral 33 represents an annular clutch rim or ring arranged on the outer end of the pulley and 34 a plurality of clutch or driving shoes movable toward and from the periphery of the clutch ring and provided on their inner sides with linings or facings 35 of asbestos adapted to grip the clutch rim. These driving shoes are moved toward and from the clutch ring by means which comprise radially movable shifting rods 30 each of which is guided in a radial guideway 36 formed on a driving or clutch head 37 which has a hub 38 mounted on the adjacent part of the shaft so as to be compelled to turn therewith. Each of these shifting rods is provided with an outer screw threaded end 39 which engages with an internally threaded opening in a lug 40 on one of the driving shoes, whereby the latter may be adjusted relatively to the clutch ring in assembling the apparatus and for taking up wear. After adjustment, the shifting rod is held in place by a clamping nut 41 arranged on the threaded part of the shifting rod and engaging the outer side of the lug 40. Slidable lengthwise on this shaft, adjacent to the outer side of the head is a shifting collar 42 which may be actuated by any suitable mechanism, for example a rock lever 43 pivoted on the pedestal and having its lower arm connected with an operating mechanism, and a split ring 45 engaging with an annular groove 46 in the outer end of the shifting collar and connected with the upper arm of the rock lever 43. The reciprocating motion of this collar is transmitted to each of the shifting rods by a toggle mechanism including a cam 44 pivoted on the driving head and engaging with the shoulders at opposite ends of the reduced neck 47 on the adjacent shifting rod, and a toggle link 48 connecting an arm 49 on the cam with the shifting collar, as shown in Figure 1.

Means are provided whereby, when the pulley is released from the direct connection with the driven shaft, the pulley may be turned in a reverse direction by motion derived indirectly from the shaft. These means in their preferred form are constructed as follows:

The numeral 50 represents a reverse driving gear pinion or rim keyed on the driving or coupling sleeve 16 and meshing constantly with a plurality of driving planetary gear pinions 51. The numeral 52 represents a plurality of driven planetary gear pinions, one of which is arranged along the side of each driving planetary pinion 51 and forms a pair therewith. Each of these driven planetary gear pinions 52 meshes with a driving planetary gear pinion 51, and also with a gear wheel or rim 53 formed on the inner end of the driven sleeve 18 which carries the pulley. Three pairs of such driving and driven planetary gear pinions are preferably employed and arranged alternately and in an annular row around the central parts of the driving and driven sleeves, as shown in Figures 1 and 2.

The driving and driven planetary gear pinions are mounted within a housing or carrier which comprises inner and outer circular end walls 8 and 9 which are journaled with their bores on bearings 54, 55, arranged on the opposing ends of the driving and driven sleeves 16, 18 and a cylindrical side wall 56 connecting the peripheries of said end walls. Each of the planetary gear pinions is journaled on the housing or carrier by a spindle or axle 57 passing through the respective planetary gear pinion and engaging its opposite ends with openings 58, 59 in the outer and inner housing end walls, and two annular rows of oppositely tapering conical bearing rollers 70, 71 arranged between opposite ends of the spindle and the planetary gear pinion and engaging with correspondingly tapering ball races 60, 61 arranged on said spindle and pinion, respectively. Each of the ball races 60, 60 is provided at its ends with peripheral flanges 82, 83 which engage with opposite ends of the respective bearing rollers 70, 71 so as to permit these rollers to move circumferentially on the races but compelling the rollers to move longitudinally with the races. The opening 59 preferably extends through the respective wall of the enclosing carrier but the opening 58 terminates at its outer end in a cavity 66 for a purpose which will presently appear.

Each of the spindles is prevented from turning, but is free to slide lengthwise by means of a spline 72 arranged on the side of its outer end and engaging with a longitudinal groove 73 at the opening 58.

For the purpose of taking up any wear or looseness in the bearings of any one of the planetary gear pinions, the spindle of the same is moved inwardly the required extent, this being preferably accomplished by an adjusting screw 62 working in the outer end wall of the housing and engaging the adjacent portion of the spindle.

Upon moving the spindle 57 inwardly its inner end slides through the ball race remote from the screw because this ball race engages the inner side of the housing carrier but the ball race near this screw is engaged by a shoulder 84 on the spindle thereby compelling this last mentioned ball race to move with the spindle, so that the two inner ball races 60, 60 are brought closer together and the wear upon the respective bearing is taken up.

For the purpose of efficiently lubricating the bearings of each planetary gear pinion, the same is provided with a longitudinal passage 63 which communicates at its inner end by lateral passages 64 in the spindle with the space within the bore of the planetary gear between its bearings while its outer end communicates by lateral passages 65 with the cavity 66 in the outer part of the opening 58. Grease or liquid lubricant is introduced into this cavity through a filling opening 67 in the side of the carrier or housing, which filling opening is normally closed by a screw plug 68. This lubricant passes from the cavity 66 through the passages in the spindle into the planetary gear pinion and to the bearings at opposite ends thereof. The lubricant which escapes from the bearings is caught in one of the pockets 69 which are formed in the housing around each pair of driving and driven planetary gear pinions whereby the teeth of the latter are constantly lubricated and prevented from wearing unduly as well as rendered less noisy. The circumferential wall of the housing forming the pockets 69 is arranged comparatively close to the planetary pinions so as to leave only a slight clearance between the same whereby the oil or grease is kept in constant motion therein and continuously thrown off by centrifugal force and again picked up by the planetary pinions so as to not only effectively lubricate the planetary gear pinions, but also lubricate the driving and driven gear pinions 50, 53 and the bearings of the housing. This cycle is carried on regardless of whether the pulley is turning forwardly or backwardly and thus permits of operating the reversing gearing with considerably less lubricant than has been required heretofore.

The housing or carrier is held against turning so that the axes of the planetary gear pinions are at rest and thereby cause the motion of the driving gear pinion on the driving shaft to turn the driven sleeve 18 which carries the pulley in a reverse direction. The holding of this carrier is effected by a brake drum 74 connected by a web 75 with the periphery of the carrier and a brake band 76 adapted to grip the periphery of the brake drum and hold the same against rotation. This brake band is operated so as to grip or release the brake drum by a three armed rock lever pivoted on the base and having two diametrically opposite arms 77, 77 connected with opposite ends of the brake band while its third arm 78 is adapted to be operated manually. Upon turning the triple armed rock lever in one direction the brake band is loosened and the pulley is capable of being turned forward directly by the shaft upon closing the clutch, but when this clutch is opened and the brake band is tightened to hold the planetary gearing against turning then the pulley will be turned backward.

It is preferable to operate the clutch and brake mechanism so that they cannot be closed at the same time, but both can be left open at the same time. The preferred means for this purpose consists of an intermediate elbow lever 7 pivoted on the base and having one arm connected by a link 79 with the lower arm 78 of the brake lever while the other arm of this elbow lever is connected by a link 80 with the lower arm of the clutch lever 43. In the neutral or central position of these parts the clutch and brake are both open but when moving the same in one direction from this neutral position the clutch will be closed and when moving the same in the other direction from this neutral position the brake will be closed.

In the absence of any provision to prevent it, the brake drum and band are liable to become unduly heated when used at frequent intervals. To avoid this objection the web connecting the brake drum and carrier is provided with a plurality of transverse openings 81 which permit air to pass through the web and carry away the heat and thus keep the drum and band of the brake mechanism cool.

I claim as my invention:

1. A motion reversing mechanism comprising a driving shaft, a pulley mounted concentrically with said shaft, and a reversing gearing for connecting and disconnecting the shaft and pulley including a driving gear pinion connected with the shaft, a driven gear pinion connected with the pulley; a plurality of pairs of intermeshing planetary gear pinions one member of each pair meshing with said driving gear pinion and the other member of each pair meshing with said driven gear pinion, a spindle passing through each planetary gear pinion and having a passage extending from one end thereof to the interior of the respective pinion, an enclosing carrier journaled at its opposite ends on said shaft and pulley and provided with a plurality of pockets each of which contains one pair of said planetary gear pinions, and provided adjacent to one end of each planetary gear pinion with an opening extending through the carrier and receiving one end of the spindles and provided adjacent to the other end of the respective planetary gear pinion with a cavity which receives that end of the respective spindle having a passage and means for supplying a lubricant to said cavity.

2. A motion reversing mechanism comprising a driving shaft, a pulley mounted concentrically with said shaft, and a reversing gearing for connecting and disconnecting the shaft and pulley including a driving gear pinion connected with the shaft, a driven gear pinion connected with the pulley, a plurality of pairs of intermeshing planetary gear pinions one member of each pair meshing with said driving gear pinion and the other member of each pair meshing with said driven gear pinion, a spindle passing through each planetary gear pinion and having a passage extending from one end thereof to the interior of the respective pinion; an enclosing carrier journaled at its opposite ends on said shaft and pulley and provided with a plurality of pockets each of which contains one pair of said planetary gear pinions, and provided adjacent to one end of each planetary gear pinion with an opening extending through the carrier and receiving one end of one of the spindles and provided adjacent to the other end of the respective planetary gear pinion with a cavity which receives that end of the respective spindle having said passage; means for supplying a lubricant to said cavity, conical roller bearings supporting opposite ends of each planetary gear pinion on its spindle, and means for taking up said conical bearings consisting of adjusting screws arranged on the carrier and projecting into said cavities each engaging the adjacent end of the respective spindle.

3. A motion reversing mechanism comprising a driving shaft, a pulley mounted concentrically with said shaft, and a reversing gearing for connecting and disconnecting the shaft and pulley including a driving gear pinion connected with the shaft, a driven gear pinion connected with the pulley, a plurality of pairs of intermeshing planetary gear pinions one member of each pair meshing with said driving gear pinion and the other member of each pair meshing with said driven gear pinion, a spindle passing through each planetary gear pinion and having a passage extending from one end thereof to the interior of the respective pinion; an enclosing carrier journaled at its opposite ends on said shaft and pulley and provided with a plurality of pockets each of which contains one pair of said planetary gear pinions, and provided adjacent to one end of each planetary gear pinion with an opening extending through the carrier and receiving one end of one of the spindles and provided adjacent to the other end of the respective planetary gear pinion with a cavity which receives that end of the respective spindle having said passage; means for supplying a lubricant to said cavity, conical roller bearings supporting opposite ends of each planetary gear pinion on its spindle, means for taking up said conical bearings consisting of adjusting screws arranged on the carrier and projecting into said cavities each engaging the adjacent end of the respective spindle, and means for preventing each of said spindles to slide on the carrier but preventing the same from turning thereon.

In testimony whereof I affix my signature.

JOHN T. DILLON.